United States Patent
Hara et al.

(10) Patent No.: US 12,149,183 B2
(45) Date of Patent: Nov. 19, 2024

(54) INVERTER CONTROL DEVICE AND ELECTRIC VEHICLE SYSTEM

(71) Applicant: HITACHI ASTEMO, LTD., Hitachinaka (JP)

(72) Inventors: Takafumi Hara, Tokyo (JP); Toshiyuki Ajima, Tokyo (JP); Akihiro Ashida, Hitachinaka (JP); Kiyoshi Kuroda, Hitachinaka (JP); Yoshinori Aoshima, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 227 days.

(21) Appl. No.: 17/788,659

(22) PCT Filed: Dec. 8, 2020

(86) PCT No.: PCT/JP2020/045573
§ 371 (c)(1),
(2) Date: Jun. 23, 2022

(87) PCT Pub. No.: WO2021/131658
PCT Pub. Date: Jul. 1, 2021

(65) Prior Publication Data
US 2023/0035063 A1    Feb. 2, 2023

(30) Foreign Application Priority Data
Dec. 27, 2019    (JP) .................... 2019-239900

(51) Int. Cl.
*H02P 21/00*    (2016.01)
*B60L 53/22*    (2019.01)
(Continued)

(52) U.S. Cl.
CPC ......... *H02M 7/53871* (2013.01); *B60L 53/22* (2019.02); *H02M 1/0009* (2021.05);
(Continued)

(58) Field of Classification Search
CPC . H02M 7/53871; H02M 1/0009; H02P 21/22; H02P 27/08; B60L 53/22
(Continued)

(56) References Cited

U.S. PATENT DOCUMENTS 5,668,713 A    9/1997 Eguchi et al.
2008/0042606 A1    12/2008 Chen et al.
(Continued)

FOREIGN PATENT DOCUMENTS

JP    8-228438 A    9/1996
JP    9-117151 A    5/1997
(Continued)

OTHER PUBLICATIONS

International Search Report with English Translation and Written Opinion in International Application No. PCT/JP2020/045573 mailed Feb. 16, 2021.

*Primary Examiner* — Erick D Glass
(74) *Attorney, Agent, or Firm* — Foley & Lardner LLP

(57) ABSTRACT

A deviation between a detection result of an output current of an inverter and an actual current is suppressed. A current detection unit 7 detects a three-phase AC current output from an inverter 3 or input to the inverter 3. An inverter control device 1 controls the inverter 3 based on a current detection value based on a detection result of the three-phase AC current by the current detection unit 7 and a predetermined current command value. The inverter control device 1 corrects the current detection value so as to correct a detection error of the three-phase AC current generated due to a delay time of a filter 72 which is a filter element provided in the current detection unit 7.

5 Claims, 18 Drawing Sheets

(51) Int. Cl.
 *H02M 1/00* (2006.01)
 *H02M 7/5387* (2007.01)
 *H02P 21/22* (2016.01)
 *H02P 27/08* (2006.01)

(52) U.S. Cl.
 CPC ............. *H02P 21/22* (2016.02); *H02P 27/08* (2013.01); *B60L 2210/40* (2013.01)

(58) Field of Classification Search
 USPC .................................................. 318/400.02
 See application file for complete search history.

(56) References Cited

U.S. PATENT DOCUMENTS

| | | | | |
|---|---|---|---|---|
| 2009/0251096 | A1* | 10/2009 | Schulz | H02P 27/08 318/432 |
| 2013/0002182 | A1* | 1/2013 | Bates | H02P 27/08 318/495 |
| 2013/0020979 | A1* | 1/2013 | Bates | H02P 23/14 318/497 |
| 2015/0229244 | A1* | 8/2015 | Astigarraga | H02P 1/04 318/376 |
| 2016/0226415 | A1 | 8/2016 | Yamaguchi et al. | |
| 2018/0201306 | A1* | 7/2018 | Tsubaki | B62D 1/286 |

FOREIGN PATENT DOCUMENTS

| | | |
|---|---|---|
| JP | 2008-48541 A | 2/2008 |
| JP | 6050841 B2 | 12/2016 |

\* cited by examiner

INVERTER CONTROL DEVICE AND ELECTRIC VEHICLE SYSTEM

TECHNICAL FIELD

The present invention relates to an inverter control device and an electric vehicle system using the same.

BACKGROUND ART

Rotary electric machines for driving (motors) used for electrically-driven vehicles, such as an electric vehicle (EV) or a hybrid electric vehicle (HEV), are required to have a large output and a high torque response. Thus, a system in which a permanent magnet rotary electric machine (PM motor) using a rare earth sintered magnet retaining strong energy is driven by a three-phase inverter is generally used. The three-phase inverter converts a DC voltage generated by a DC power supply into a line voltage (AC voltage) at arbitrary voltage and frequency by pulse width modulation (PWM) control, thereby implementing variable speed driving of the motor.

The three-phase inverter mounted on the electrically-driven vehicle generally detects a three-phase current output from the three-phase inverter and controls the three-phase current so as to match a current command based on a torque command determined based on a stepping force of a driver. The three-phase current is detected using a current detection element present on a main circuit of the inverter and an A/D converter that converts an analog signal detected by the current detection element into a digital signal. The current detection element is provided with a filter for the purpose of removing noise riding on a signal line similarly to a general electrical circuit. This noise removal filter can remove noise, but the three-phase current passing through the noise removal filter has a delay element, and thus, a deviation occurs between a detection current and an actual current flowing through the inverter.

Furthermore, recently, motors having a small inductance value and a small electrical time constant, such as low-voltage high-current motors for in-vehicle use, have increased. In such motors, the deviation between the detection current and the actual current increases as compared with conventional motors.

In conventional inverters, a torque command does not coincide with actual output torque due to a deviation between a detection current and an actual current occurring as described above, and thus, there is a problem that it is difficult to achieve acceleration performance requested by a driver. In addition, the accuracy of a fail-safe function for protecting the inverter and the motor is degraded, and there is a possibility that the inverter and the motor are destroyed in the worst case.

In order to prevent such a deviation between the detection current and the actual current flowing through the inverter, for example, a technique of PTL 1 is known. PTL 1 describes the technique of detecting a current slope through a filter having a small time constant and switching between a plurality of the filters having different time constants based on the detection result.

CITATION LIST

Patent Literature

PTL 1: Japanese Patent No. 6050841

SUMMARY OF INVENTION

Technical Problem

Since it is necessary to provide the plurality of filters having different time constants, it is difficult to adopt the technique of PTL 1 when a mounting area of a substrate is limited. In addition, it is difficult to sufficiently remove the noise the filters having small time constants, and thus, the slope of the detection current is shifted from a true value, and as a result, it is difficult to appropriately perform switching between the filters, and the deviation between the detection current and the actual current is likely to deteriorate. In particular, a current ripple increases in the motors having the small inductance as described above, there is a high possibility that the deviation between the detection current and the actual current deteriorates.

Solution to Problem

An inverter control device according to the present invention is configured to control an inverter based on a current detection value, obtained based on a detection result of an AC current by a current detection unit that detects the AC current output from the inverter or input to the inverter, and a predetermined current command value, and includes a correction unit that corrects either the current detection value or the current command value to correct a detection error of the AC current generated due to a delay time of a filter element provided in the current detection unit.

An electric vehicle system according to the present invention includes the inverter control device, the inverter to be controlled by the inverter control device, and a three-phase synchronous motor driven by the inverter, and travels using a rotational driving force of the three-phase synchronous motor.

Advantageous Effects of Invention

According to the present invention, it is possible to suppress a deviation between a detection result of an output current of an inverter and an actual current.

DESCRIPTION OF EMBODIMENTS

First Embodiment

Hereinafter, a first embodiment of the present invention will be described with reference to the drawings.

Figure 1:
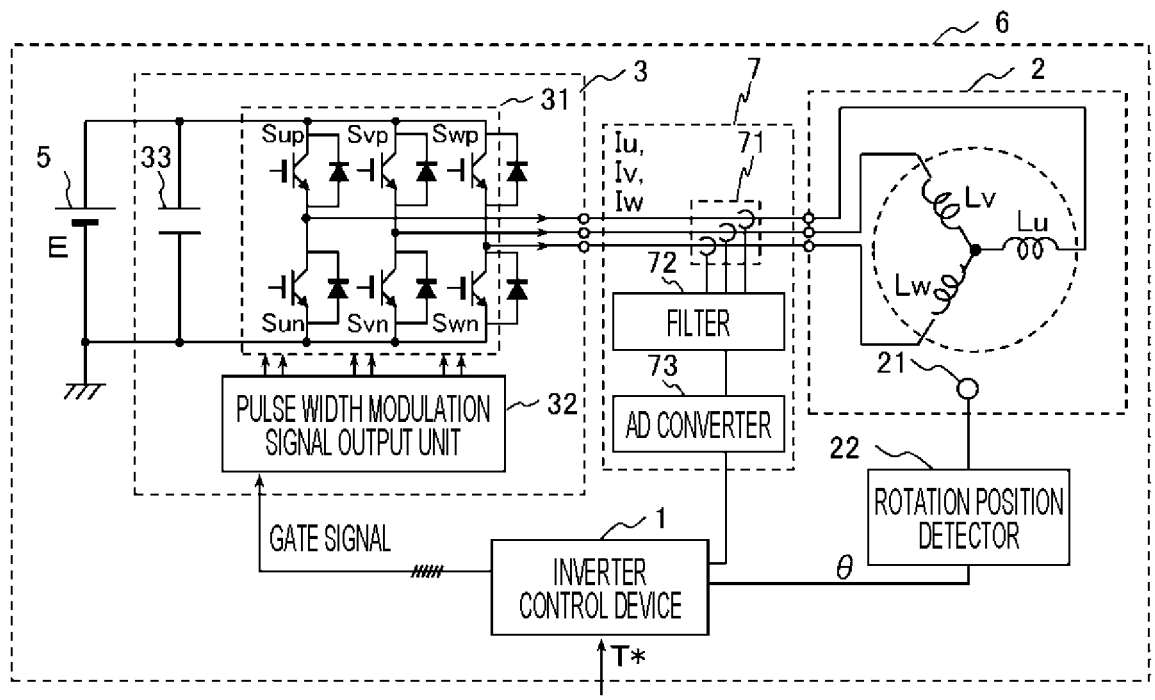
FIG. 1 is a block diagram illustrating a configuration of a motor drive device including an inverter control device according to a first embodiment of the present invention.

FIG. 1 is a block diagram illustrating a configuration of a motor drive device 6 including an inverter control device according to the first embodiment of the present invention. The motor drive device 6 includes an inverter control device 1, a motor 2, an inverter 3, a high-voltage battery 5, and a current detection unit 7.

The inverter control device 1 outputs a gate signal to the inverter 3 based on a torque command T* according to target torque required from a vehicle, and controls the inverter 3. Note that details of the inverter control device 1 will be described later.

The inverter 3 is connected to the motor 2 and the high-voltage battery 5, and includes an inverter circuit 31, a pulse width modulation signal output unit 32, and a smoothing capacitor 33.

The inverter circuit 31 includes upper arm switching elements Sup, Svp, and Swp and lower arm switching elements Sun, Svn, and Swn. When the motor 2 is in a power running state, DC power supplied from a high-voltage battery 5 is converted into AC power using these switching elements and output to the motor 2. In addition, when the motor 2 is in a regeneration state, AC power generated by the motor 2 is converted into DC power and output to the high-voltage battery 5. This enables mutual conversion between DC power and AC power in the inverter 3.

The pulse width modulation signal output unit 32 outputs a pulse width modulation signal (PWM signal) to each switching element of the inverter circuit 31 based on the gate signal from the inverter control device 1. Each switching element performs a switching operation at a predetermined timing according to the PWM signal input from the pulse width modulation signal output unit 32, whereby the inverter circuit 31 performs the mutual conversion between DC power and AC power.

The smoothing capacitor 33 smooths DC power supplied from the high-voltage battery 5 to the inverter circuit 31 or DC power output from the inverter circuit 31 to the high-voltage battery 5.

The high-voltage battery 5 is a DC voltage source of the motor drive device 6. A power supply voltage E of the high-voltage battery 5, which is a DC voltage, is converted into a pulsed three-phase AC voltage having a variable voltage and a variable frequency by the inverter 3, and is applied to the motor 2 as a line voltage. Note that the DC voltage E of the high-voltage battery 5 greatly fluctuates according to a charging state of the high-voltage battery 5.

The motor 2 is a synchronous motor rotationally driven by supply of the line voltage from the inverter 3. A rotation position sensor 21 is attached to the motor 2 in order for the inverter control device 1 to control a phase of the three-phase AC voltage in accordance with a phase of an induced voltage of the motor 2. A rotation position detector 22 computes a rotation position θ of a rotor in the motor 2 based on an output signal of the rotation position sensor 21. Here, for example, a resolver including an iron core and a winding or the like can be used as the rotation position sensor 21. Alternatively, the rotation position sensor 21 may be configured using a magnetoresistive element such as a GMR sensor, a Hall element, or the like. In addition, the rotation position θ may be estimated based on a three-phase current or a three-phase voltage of the motor 2 without providing the rotation position detector 22 in the motor drive device 6.

The current detection unit 7 detects a U-phase AC current Iu, a V-phase AC current Iv, and a W-phase AC current Iw as three-phase AC currents that energize the motor 2. The current detection unit 7 includes a current detection element 71, a filter 72, and an analog/digital (AD) converter 73.

The current detection element 71 is configured using a Hall element or the like, detects the respective three-phase AC currents Iu, Iv, and Iw, and outputs voltages corresponding to these current values. Note that FIG. 1 illustrates an example in which the current detection unit 7 includes three current detection elements 71 respectively corresponding to phases of the three-phase AC currents, but two current detection elements 71 may be provided, and a current value of the remaining one phase may be calculated on the basis of the fact that the sum of the three-phase currents is zero. In addition, a pulsed DC bus current flowing into the inverter 3 may be detected as a voltage (DC current detection value Idc) across a shunt resistor Rsh inserted between the smoothing capacitor 33 and the inverter 3, and the three-phase AC currents may be obtained from a result of the detection. For example, the three-phase AC currents can be reproduced from the DC current detection value Idc by acquiring the DC current detection value Idc at an appropriate timing according to states of the respective switching elements of the inverter 3. In addition, the three-phase AC currents Iu, Iv, and Iw can be detected by any method.

The filter 72 is configured to remove noise from a voltage signal, which is an output of the current detection element 71, and includes a resistor and a capacitor. A time constant τ of the filter 72 is derived from the following Formula (1) using a resistance component Rf and a capacitance component Cf of the filter 72.

$$\tau = Rf \times Cf \quad (1)$$

The analog/digital (AD) converter 73 acquires the voltage signal input from the current detection element 71 via the filter 72 as analog data, and converts the voltage signal into digital data at a predetermined sampling rate. The digital data thus obtained is output from the analog/digital (AD) converter 73 to the inverter control device 1. This enables the inverter control device 1 to acquire the detection value of the three-phase AC current as the digital data.

Figure 2:
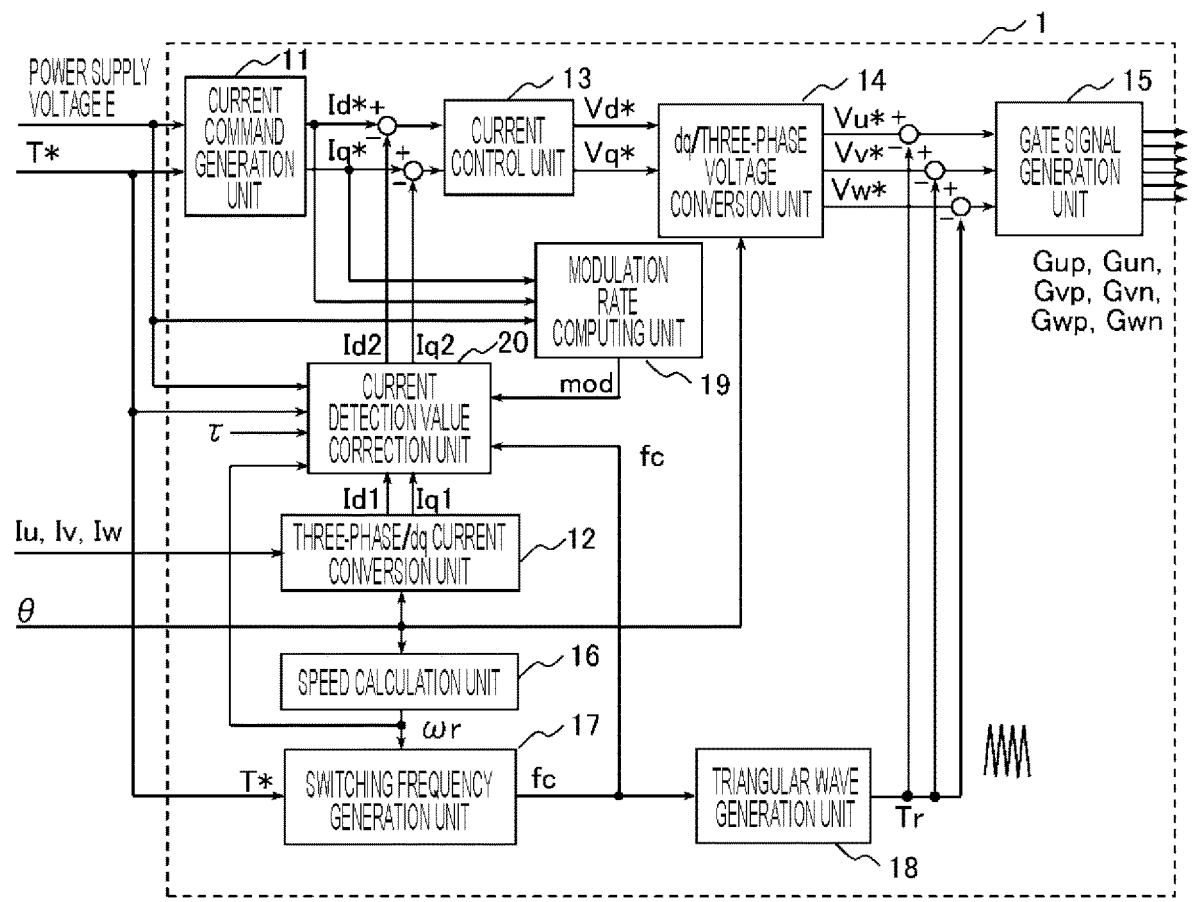
FIG. 2 is a functional block diagram of the inverter control device according to the first embodiment of the present invention.

Next, details of the inverter control device 1 will be described with reference to FIG. 2. FIG. 2 is a functional block diagram of the inverter control device 1 according to the first embodiment of the present invention. The inverter control device 1 according to the present embodiment includes functional blocks of a current command generation unit 11, a three-phase/dq current conversion unit 12, a current control unit 13, a dq/three-phase voltage conversion unit 14, a gate signal generation unit 15, a speed calculation unit 16, a switching frequency generation unit 17, a triangular wave generation unit 18, a modulation rate computing unit 19, and a current detection value correction unit 20, and drives the inverter circuit 31 of the inverter 3 according to a d-axis current command Id* and a q-axis current command Iq* corresponding to the power supply voltage E and the torque command T*. The inverter control device 1 is configured using, for example, a microcomputer, and can implement these functional blocks by executing a predetermined program in the microcomputer. Alternatively, some or all of these functional blocks may be implemented using a hardware circuit such as a logic IC or an FPGA.

The current command generation unit 11 determines the d-axis current command Id* and the q-axis current command Iq* using a relational expression or a map of motor torque based on the torque command T* and the power supply voltage E.

The three-phase/dq current conversion unit 12 computes a d-axis current detection value Id1 and a q-axis current detection value Iq1 obtained by dq conversion of the detection value of the three-phase AC current based on pieces of digital data of the U-phase AC current Iu, the V-phase AC current Iv, and the W-phase AC current Iw output from the current detection unit 7 and the rotation position θ output from the rotation position detector 22. Note that the d-axis current detection value Id1 and the q-axis current detection value Iq1 computed by the three-phase/dq current conversion unit 12 are referred to as a "first d-axis current detection value Id1" and a "first q-axis current detection value Iq1", respectively.

The current detection value correction unit 20 corrects each of the first d-axis current detection value Id1 and the first q-axis current detection value Iq1 computed by the three-phase/dq current conversion unit 12 so as to correct detection errors of the U-phase AC current Iu, the V-phase AC current Iv, and the W-phase AC current Iw generated due to a delay time of the filter 72 provided in the current detection unit 7. Then, a d-axis current detection value Id2 and a q-axis current detection value Iq2 according to these correction results are output. Note that details of the current detection value correction unit 20 will be described later. Hereinafter, the d-axis current detection value Id2 and the q-axis current detection value Iq2 computed by correcting the first d-axis current detection value Id1 and the first q-axis current detection value Iq1 by the current detection value correction unit 20 are referred to as a "second d-axis current detection value Id2" and a "second q-axis current detection value Iq2", respectively.

The current control unit 13 computes a d-axis voltage command Vd* and a q-axis voltage command Vq* such that the d-axis current command Id* and the q-axis current command Iq* computed by the current command generation unit 11 coincide with the second d-axis current detection value Id2 and the second q-axis current detection value Iq2 computed by the current detection value correction unit 20, respectively.

The dq/three-phase voltage conversion unit 14 computes a U-phase voltage command value Vu*, a V-phase voltage command value Vv*, and a W-phase voltage command value Vw* which are three-phase voltage command values obtained by UVW conversion of the d-axis voltage command Vd* and the q-axis voltage command Vq* based on the d-axis voltage command Vd* and the q-axis voltage command Vq* output from the current control unit 13 and the rotation position θ output from the rotation position detector 22.

The gate signal generation unit 15 generates a pulsed voltage for each of the U phase, the V phase, and the W phase based on a comparison result between the three-phase voltage command values output from the dq/three-phase voltage conversion unit 14, that is, the U phase voltage command value Vu*, the V phase voltage command value Vv*, and the W phase voltage command value Vw*, and a triangular wave signal Tr output from the triangular wave generation unit 18. Then, gate signals for the switching elements of the respective phases of the inverter 3 are generated based on the generated pulsed voltages. At this time, upper arm gate signals Gup, Gvp, and Gwp of the respective phases are logically inverted to generate lower arm gate signals Gun, Gvn, and Gwn. The gate signals generated by the gate signal generation unit 15 are output from the inverter control device 1 to the pulse width modulation signal output unit 32 of the inverter 3, and converted into the PWM signals by the pulse width modulation signal output unit 32. As a result, the respective switching elements of the inverter circuit 31 are controlled to be turned on/off, and the output voltage of the inverter 3 is adjusted.

The speed calculation unit 16 computes an electrical angular frequency ωr according to the rotation speed (rotational speed) of the motor 2 from a temporal change of the rotation position θ.

The switching frequency generation unit 17 outputs a switching frequency fc based on the torque command T* and the electrical angular frequency ωr. Note that a constant switching frequency fc that is determined in advance may be output.

The triangular wave generation unit 18 outputs the triangular wave signal Tr based on the switching frequency fc.

The modulation rate computing unit 19 computes a modulation rate mod of the inverter 3 based on the d-axis current command Id* and the q-axis current command Iq* computed by the current command generation unit 11 and the power supply voltage E. In order to compute modulation rate mod, the modulation rate computing unit 19 first computes a d-axis voltage Vd and a q-axis voltage Vq based on following Formula (2). Note that Formula (2) is a voltage equation of the motor 2.

$$Vd = R \times Id - \omega r \times Lq \times Iq$$

$$Vq = R \times Iq + \omega r \times Ld \times Id + \omega r \times Ke \quad (2)$$

In Formula (2), Id and Iq represent a d-axis current and a q-axis current, respectively. In the present embodiment, Formula (2) is calculated with Id=Id* and Iq=Iq*. In addition, ωr represents the electrical angular frequency of the motor 2, and is computed by the speed calculation unit 16 as described above. Furthermore, Ld and Lq represent a d-axis inductance and a q-axis inductance, respectively, Ke represents an induced voltage constant, and R represents a winding resistance. These values are determined in advance according to a structure of the motor 2.

Note that the induced voltage constant Ke has temperature dependence, the induced voltage constant Ke of Formula (2) may be corrected in consideration of the temperature dependence based on the following Formula (3). Formula (3) represents a relationship between a temperature of the rotor of the motor 2 and an induced voltage. Formula (3) shows that a temperature of a magnet of the rotor changes when the temperature of the rotor varies from a normal temperature T_nomi, and accordingly, it can be seen that the induced voltage varies linearly.

$$Ke=Ke\_nomi+(T-Tnomi)\times K \qquad (3)$$

In Formula (3), Ke_nomi represents the induced voltage constant at the normal temperature, T_nomi represents a normal temperature of the rotor, and K represents a temperature-dependent slope of the induced voltage. These values are determined in advance according to a structure of the motor 2. In addition, T represents the rotor temperature, and is acquired using a temperature sensor (not illustrated) or the like.

The modulation rate computing unit 19 calculates the modulation rate mod using following Formula (4) based on the d-axis voltage Vd and the q-axis voltage Vq derived from Formula (2).

$$mod=2\sqrt{(Vd^2+Vq^2)}/E \qquad (4)$$

Note that a voltage utilization rate defined by the following Formula (5) may be used instead of the modulation rate mod. Since the same computation can be performed in either case, the case of using the modulation rate mod will be described hereinafter.

$$\text{Voltage utilization rate}=(\text{Effective line voltage value})/E \qquad (5)$$

Next, before describing the details of the current detection value correction unit 20 which is a feature of the present embodiment, focused events that have led to the present invention will be described below.

Figure 3:
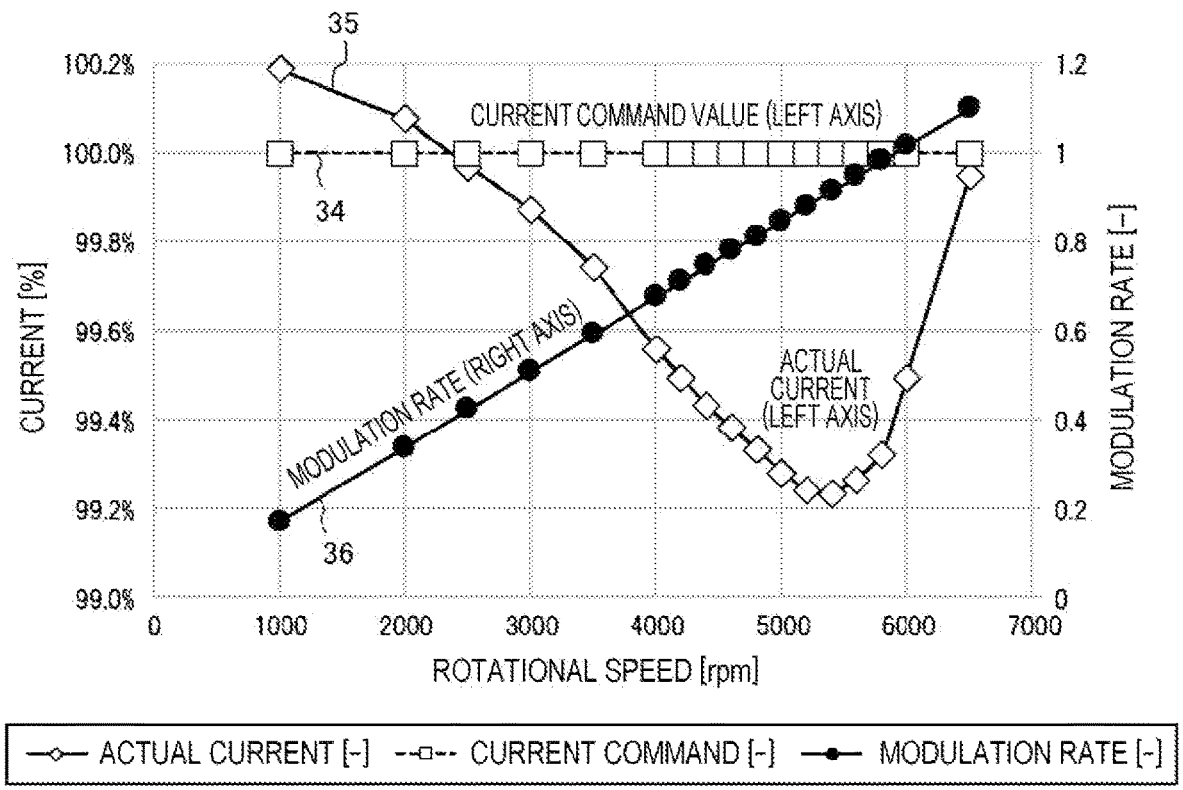
FIG. 3 is a view for describing a deviation between a current command value and an actual current according to a modulation rate.

FIG. 3 is a view for describing a deviation between a current command value and an actual current according to a modulation rate. FIG. 3 illustrates an example of a relationship among a rotational speed of the motor 2, the current command value, the actual current, and the modulation rate when the current command value and a power supply voltage are constant.

As illustrated in FIG. 3, it can be seen that the actual current flowing from the inverter 3 to the motor 2 deviates from the current command value of the inverter 3 as the rotational speed of the motor 2 increases and the modulation rate increases, and the magnitude of the deviation is about 0.8% at the maximum. Although this error is small when viewed alone, the influence factors that determine the torque accuracy of the motor 2 include, for example, a rotor temperature (magnet temperature) T and a winding resistance R. Thus, it is necessary for the inverter control device 1 to acquire it current detection value in which an error due to the deviation from the actual current is reduced as much as possible in order to improve the torque accuracy. Furthermore, the current detection value is also used to protect the inverter 3 and the motor 2, and thus, the acquisition of the current detection value that coincides with the actual current is important also from the viewpoint of preventing damage to the inverter 3 and the motor 2.

Subsequently, two reasons why the deviation according to the modulation rate mod calculated by the above-described Formula (4) occurs between the current detection value, acquired by the current detection unit 7 at a timing according to the triangular wave signal Tr, and the actual current will be described below with reference to FIGS. 4 to 6.

First, the first reason is that the filter 72 is present as an RC filter for noise removal in the current detection unit 7. As illustrated in FIG. 1, the current detection unit 7 that detects the three-phase AC current is provided with the filter 72 configured using the resistor and the capacitor. Since the inverter control device 1 acquires a current detection value through the filter 72, a delay occurs in the current detection value with respect to an actual current, which causes a deviation from a true value.

Figure 4:
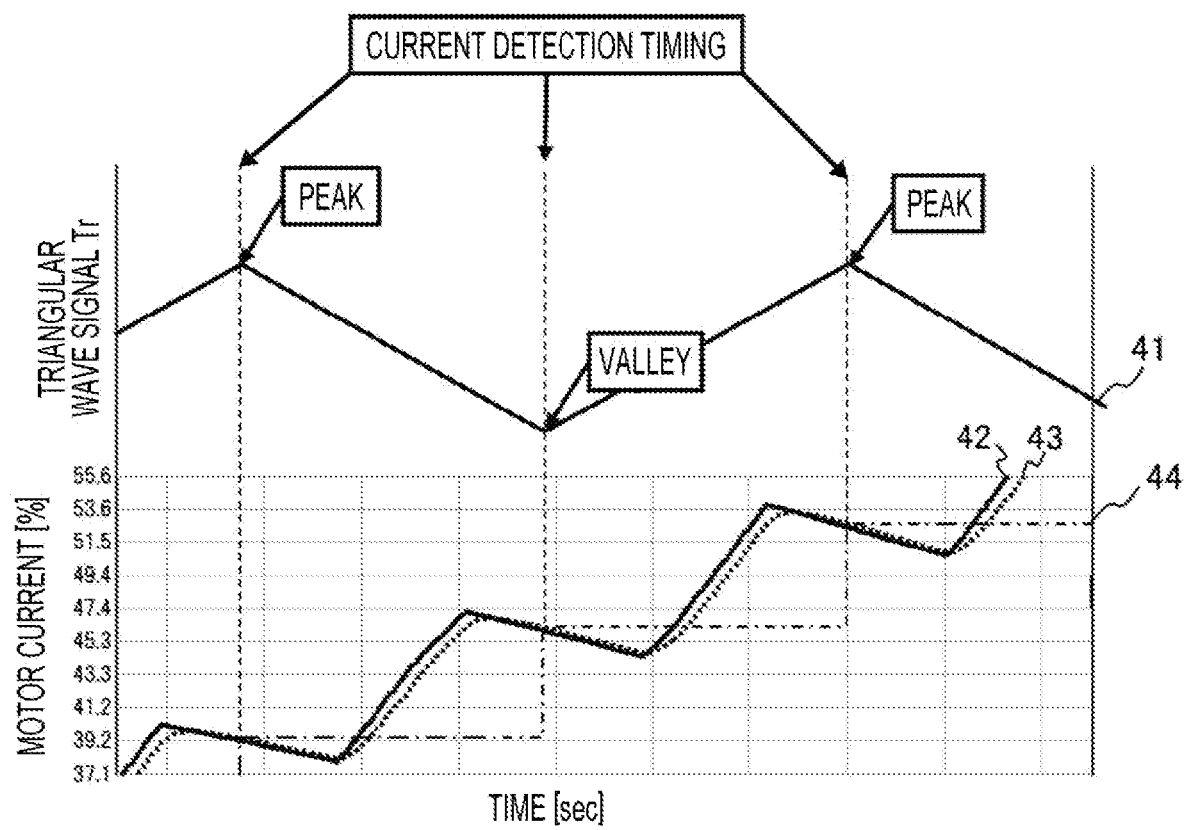
FIG. 4 is a view illustrating a relationship among a triangular wave signal, the actual current, and a current detection value.

FIG. 4 is a view illustrating a relationship among the triangular wave signal Tr, the actual current, and the current detection value. In FIG. 4, the U-phase AC current Iu among the three-phase AC currents is taken as an example, and the triangular wave signal Tr output from the triangular wave generation unit 18, an actual value (actual current) of the U-phase AC current Iu, and a value (current detection value) of the U-phase AC current Iu passing through the filter 72 in the current detection unit 7 are denoted by reference signs 41, 42, and 43, respectively. In addition, a digital data value obtained by sampling and holding the current detection value 43 by the analog/digital (AD) converter 73 is denoted by reference sign 44.

As illustrated in FIG. 4, the analog/digital (AD) converter 73 acquires detection values of the U-phase AC current Iu by sampling and holding, for example, at a timing at which the triangular wave signal Tr is on a peak side, that is, changes from rising to falling, and at a timing at which the triangular wave signal Tr is on a valley side, that is, changes from falling to rising, and outputs the acquired detection values to the inverter control device 1. Note that the detection value of the U-phase AC current Iu may be acquired by only one of the peak side and the valley side of the triangular wave signal Tr in terms of a restriction on a processing load of the inverter control device 1 or the like.

Comparing the actual current 42 with the current detection value 43 in FIG. 4, the current detection value 43 is slightly higher than the actual current 42 at the timings at which the triangular wave signal Tr is on the peak side and the valley side. Thus, the digital data value 44 obtained from the current detection value 43 is also higher than the actual current 42 at the time of sampling. Since the current detection unit 7 acquires the current detection value 43 through the filter 72 in this manner, it can be seen that a delay occurs in the current detection value 43 with respect to the actual current 42, and a deviation occurs.

Next, the second reason is that the current detection value is affected by a carrier harmonic voltage ripple that changes depending on the modulation rate mod.

Figure 5:
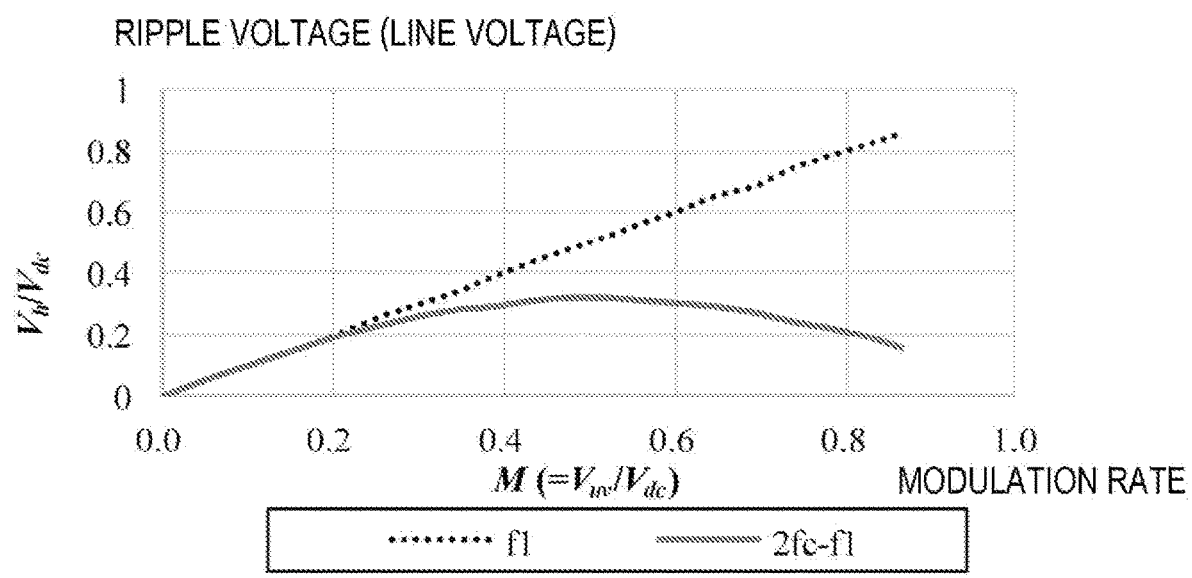
FIG. 5 is a view illustrating carrier harmonic voltage ripples that change depending on the modulation rate.

FIG. 5 is a view illustrating carrier harmonic voltage ripples that change depending on the modulation rate mod. As described above, the current detection values of the three-phase AC current output from the current detection unit 7 to the inverter control device 1 are detected on each of the peak side and the valley side of the triangular wave signal Tr. Thus, a frequency component mainly affecting the current detection value is a double component of the switching frequency fc of the triangular wave signal Tr. As can be seen from FIG. 5, the double component (2fc+/−f1) of the switching frequency fc has the maximum modulation rate mod in the vicinity of 0.6. Note that f1 is a fundamental frequency of the motor 2 and is given by the following Formula (6).

$$f1=(\text{Motor rotational speed})/60\times(\text{Number of poles of motor})/2 \quad (6)$$

As described above, the deviation according to the modulation rate mod occurs between the current detection value acquired by the current detection unit 7 and the actual current due to the "RC filter for noise removal" and the "carrier harmonic voltage ripple changing depending on the modulation rate". Therefore, in the present invention, the current detection value correction unit 20 in the inverter control device 1 corrects the current detection value acquired from the current detection unit 7 based on the time constant of the RC filter, the switching frequency fc, and the power supply voltage E to remove the deviation from the actual current.

Subsequently, the details of the current detection value correction unit 20 will be described below. FIG. 6 is a functional block diagram of the current detection value correction unit 20 according to the first embodiment of the present invention. The current detection value correction unit 20 of the present embodiment includes functional blocks of a correction current calculation unit (power running) 201, a correction current calculation unit (regeneration) 202, a power running/regeneration determination unit 203, a switching unit 204, a current absolute value computing unit 205, a correction gain computing unit 206, a d-axis correction unit 207, and a q-axis correction unit 208.

The correction current calculation unit (power running) 201 and the correction current calculation unit (regeneration) 202 calculate a correction current for power running $\Delta Icmp\_p$ and a correction current for regeneration $\Delta Icmp\_g$, respectively, based on the modulation rate mod, the power supply voltage E, the switching frequency fc, the filter delay time constant $\tau$, and a current amplitude $|I|$. Hereinafter, a relationship between each of these correction currents and each of the modulation rate mod, the power supply voltage E, the current amplitude $|I|$, the switching frequency fc, and the filter delay time constant $\tau$ will be described in order, and then, a method for calculating the correction current will be described in detail.

Figure 7:
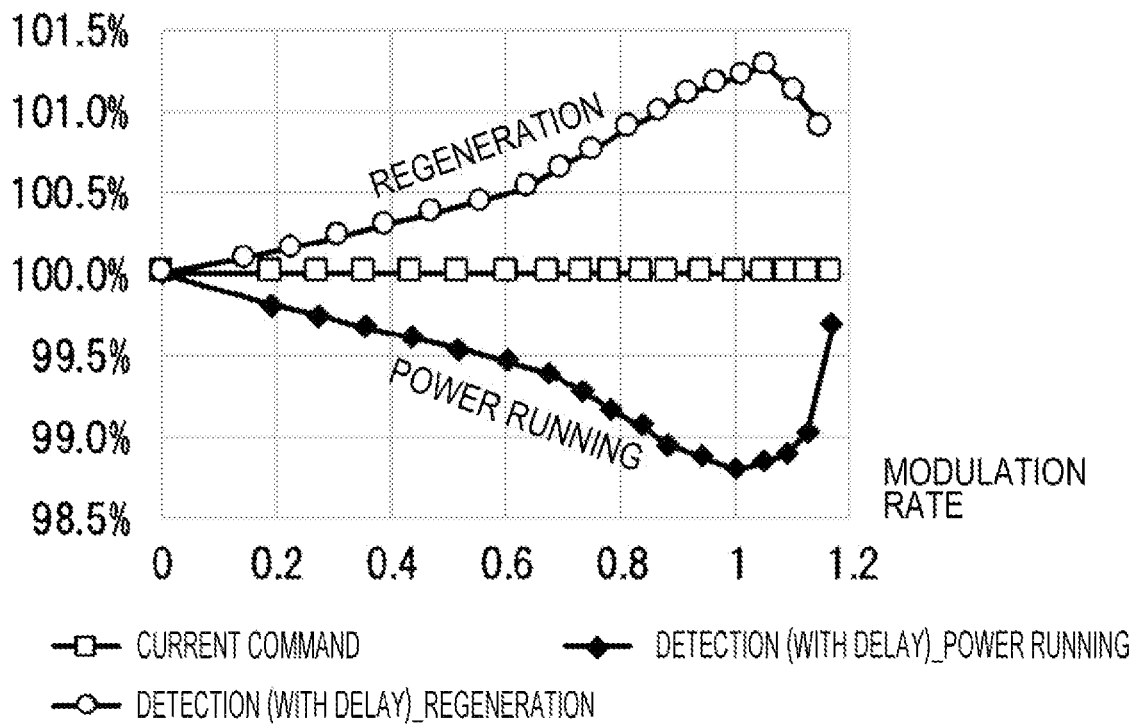
FIG. 7 is a view illustrating an example of a relationship between the current command value and the current detection value when the modulation rate is changed.

First, the relationship between the correction current and the modulation rate mod will be described. FIG. 7 is a view illustrating an example of the relationship between the current command value and the current detection value when the modulation rate mod is changed. Note that the power supply voltage E, the switching frequency fc, and the filter delay time constant $\tau$ are constant values in FIG. 7.

As illustrated in FIG. 7, the current detection value changes depending on the modulation rate mod, and a deviation from the current command value occurs. Therefore, it can be seen that the correction current needs to be changed according to the modulation rate mod in order to compensate for such a deviation.

In addition, the current command value and the current detection value deviate in directions that differ between the power running and the regeneration as illustrated in FIG. 7. That is, a level of the current detection value with respect to the current command value differs between the power running and the regeneration. The reason therefor will be described with reference to FIGS. 8 and 9 below.

Figure 8:
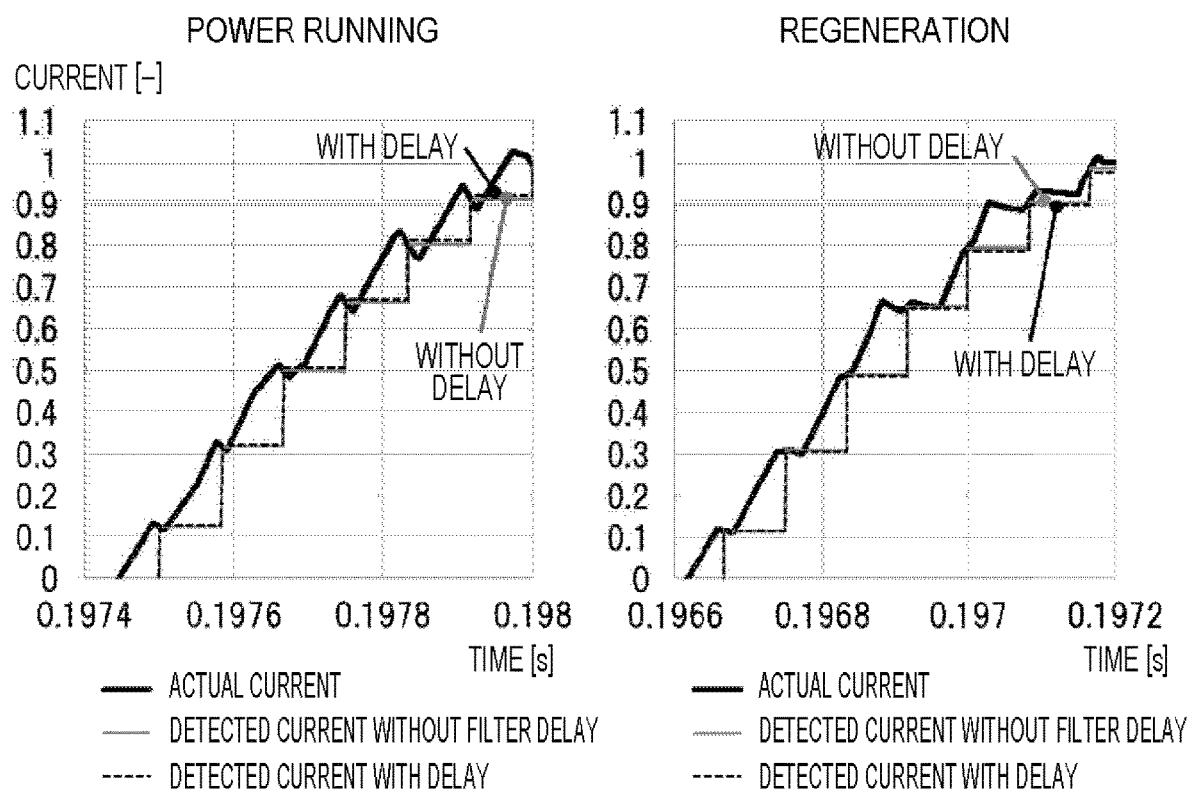
FIG. 8 is a view illustrating examples of the actual current and the current detection value during power running and during regeneration when motor torque is inverted between positive and negative with a motor rotational speed being constant.

FIG. 8 is a view illustrating examples of the actual current and the current detection value during power running and during regeneration when the motor torque is inverted between positive and negative with the motor rotational speed being constant. As illustrated on the left side of FIG. 8, the actual current including a current ripple is detected at the fall of the current ripple during the power running. Thus, the current detection value in a case where there is a filter delay is larger than the current detection value in a case where there is no filter delay. On the other hand, the actual current including a current ripple is detected at the rise of the current ripple during the regeneration as illustrated on the right side of FIG. 8. Thus, the current detection value in the case where there is the filter delay is smaller than the current detection value in the case where there is no filter delay.

Figure 9:
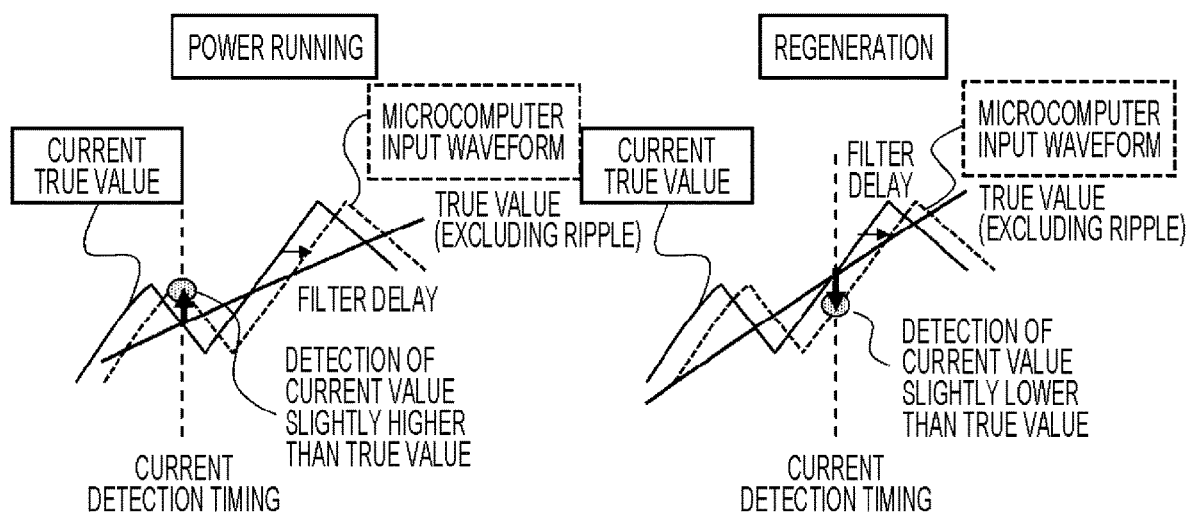
FIG. 9 is a view for describing a change in a deviation direction between a true value and a detection value according to a detection position of a current ripple.

FIG. 9 is a view for describing a change in a deviation direction between the true value and the detection value according to a detection position of the current ripple. As illustrated on the left side of FIG. 9, a current higher than a true value is detected due to the filter delay during the power running detected at the falling of the current ripple. On the other hand, as illustrated on the right side of FIG. 9, a current lower than a true value is detected due to the filter delay during the regeneration detected at the rise of the current ripple.

Therefore, the level of the current detection value with respect to the current command value differs between the power running and the regeneration as described with reference to FIG. 7. Therefore, it can be seen that the correction current also needs to be changed between the power running and the regeneration accordingly.

Figure 10:
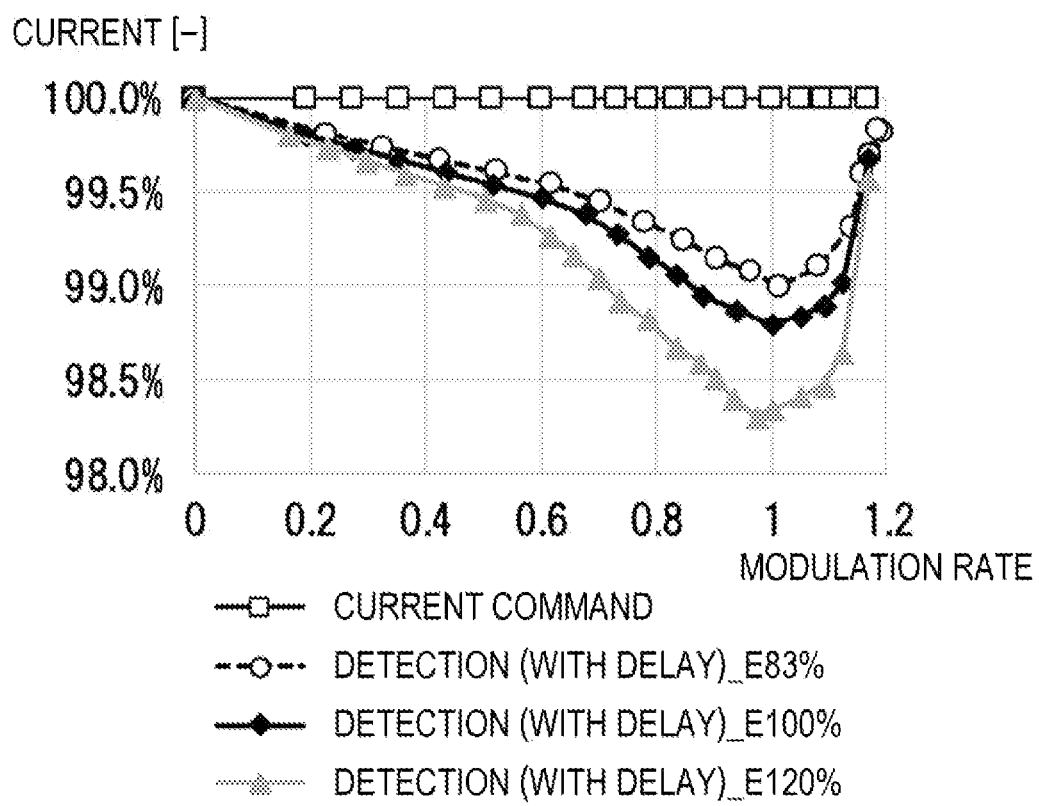
FIG. 10 is a view illustrating an example of a relationship between a current command value and a current detection value when each of a modulation rate and a power supply voltage is changed.

Next, the relationship between the correction current and the power supply voltage E will be described. FIG. 10 is a view illustrating an example of the relationship between the current command value and the current detection value when each of the modulation rate mod and the power supply voltage E is changed. Note that the current amplitude $|I|$, the switching frequency fc, and the filter delay time constant $\tau$ are constant values in FIG. 10.

As illustrated in FIG. 10, a deviation between the current command value and the current detection value changes in proportion to the power supply voltage E. This is because the current ripple increases as the power supply voltage E increases. Therefore, it can be seen that the correction current needs to be changed in proportion to the power supply voltage E in order to compensate for such a deviation.

Figure 11:
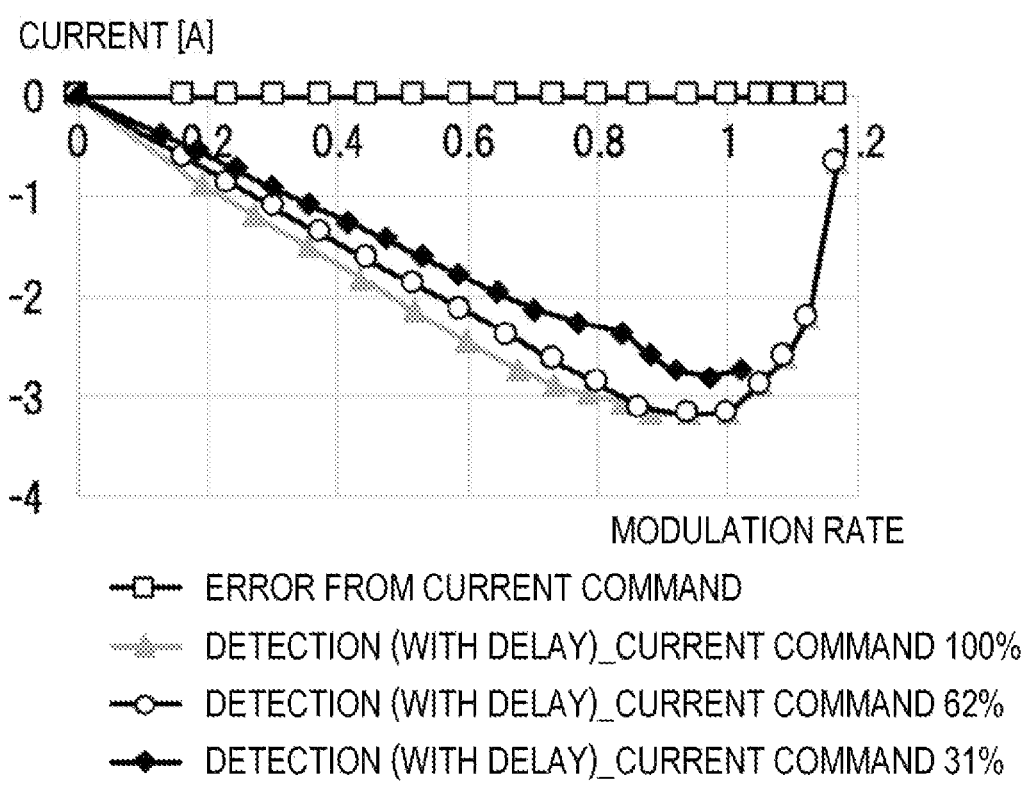
FIG. 11 is a view illustrating an example of the relationship between the current command value and the current detection value when the modulation rate is changed.

Next, the relationship between the correction current and the current amplitude $|I|$ will be described. FIG. 11 is a view illustrating an example of the relationship between the current command value and the current detection value when the modulation rate mod is changed. Note that the switching frequency fc and the filter delay time constant $\tau$ are constant values in FIG. 11.

As illustrated in FIG. 11, the current detection value increases as the current command value is increased, and a deviation between the current command value and the current detection value increases accordingly. Therefore, it can be seen that the correction current needs to be changed according to the current amplitude $|I|$ in order to compensate for such a deviation.

Figure 12:
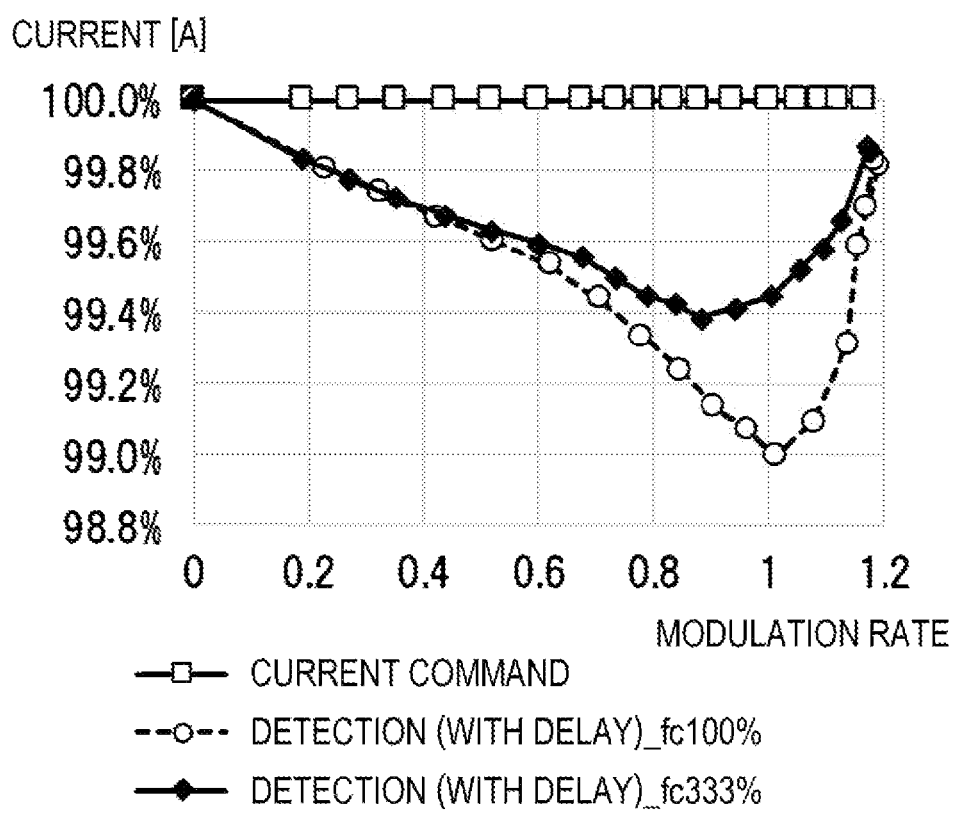
FIG. 12 is a view illustrating an example of the relationship between the current command value and the current detection value when each of the modulation rate and a switching frequency is changed.

Subsequently, the relationship between the correction current and the switching frequency fc will be described. FIG. 12 is a view illustrating an example of the relationship between the current command value and the current detection value when each of the modulation rate mod and the switching frequency fc is changed. Note that the power supply voltage E, the current amplitude |I|, and the filter delay time constant τ are constant values in FIG. 12.

As illustrated in FIG. 12, a deviation between the current command value and the current detection value decreases as the switching frequency fc increases. This is because a current flowing through the motor 2 changes little by little at a short cycle when the switching frequency fc increases, so that the current ripple decreases. Therefore, it can be seen that the correction current needs to be changed in inverse proportion to the switching frequency fc in order to compensate for such a deviation.

Figure 13:
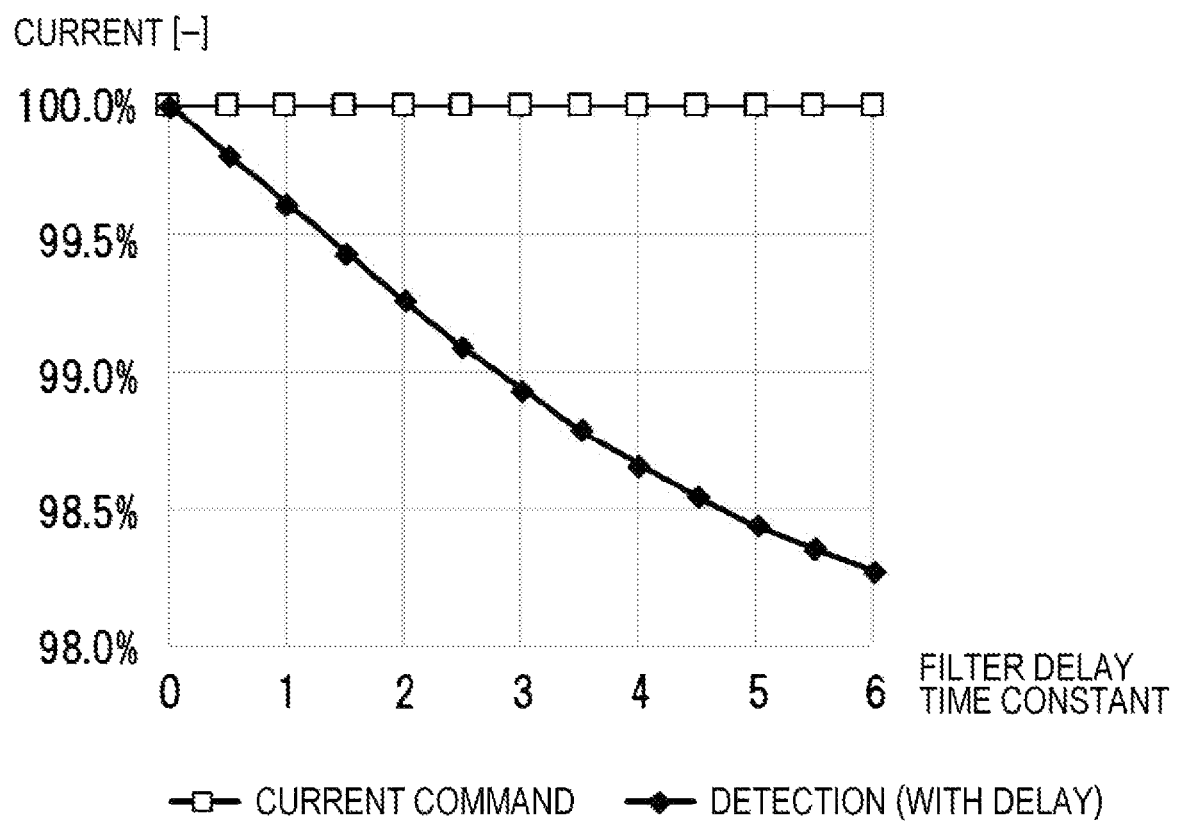
FIG. 13 is a view illustrating an example of a relationship between the current command value and the current detection value when a filter delay time constant is changed.

Finally, the relationship between the correction current and the filter delay time constant τ will be described. FIG. 13 is a view illustrating an example of the relationship between the current command value and the current detection value when the filter delay time constant τ is changed. Note that the power supply voltage E, the current amplitude |I|, and the switching frequency fc are constant values in FIG. 13.

As illustrated in FIG. 13, a deviation between the current command value and the current detection value increases as the filter delay time constant τ increases. This is because the detection position of the current ripple illustrated in FIG. 9 is shifted as the filter delay time constant τ becomes longer. Therefore, it can be seen that the correction current needs to be changed according to the filter delay time constant τ in order to compensate for such a deviation.

To summarize the relationships described above, the correction current for power running ΔIcmp_p and the correction current for regeneration ΔIcmp_g are expressed by the following Formulas (7) and (8), respectively. That is, the correction current calculation unit (power running) 201 computes the correction current for power running ΔIcmp_p by Formula (7), and the correction current calculation unit (regeneration) 202 computes the correction current for regeneration ΔIcmp_g by Formula (8).

$$\Delta Icmp\_p = E/fc \times \tau \times f\_p(mod) \tag{7}$$

$$\Delta Icmp\_g = E/fc \times \tau \times f\_g(mod) \tag{8}$$

In Formulas (7) and (8), E represents the power supply voltage, fc represents the switching frequency, and τ represents the filter delay time constant. In addition, f_p (mod) in Formula (7) represents a coefficient determined based on a correction table for power running depending on the modulation rate, and f_g (mod) in Formula (8) represents a coefficient determined based on a correction table for regeneration depending on the modulation rate. Note that values of these correction tables may be derived in advance by a simulation or an experiment under a condition that each parameter of the power supply voltage E, the switching frequency fc, and the filter delay time constant τ is constant. Furthermore, f_p (mod) and f_g (mod) may be obtained by performing linear interpolation using a map of a plurality of conditions obtained by changing and combining these parameters. Even in this case, effects of the present invention are sufficiently exhibited.

Figure 6:
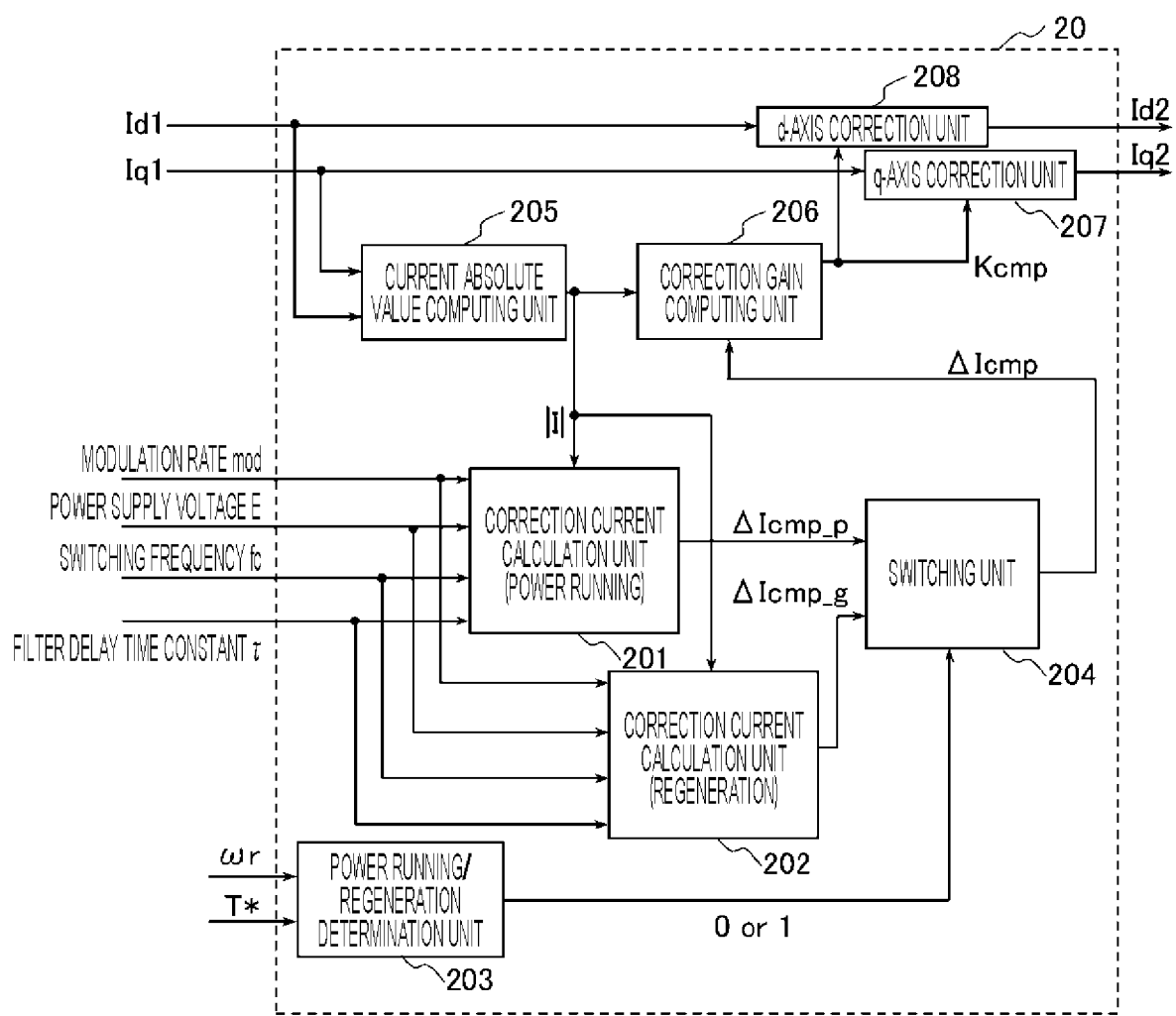
FIG. 6 is a functional block diagram of a current detection value correction unit according to the first embodiment of the present invention.

Returning to the description of FIG. 6, the power running/regeneration determination unit 203 determines whether the operation of the inverter 3 is in a power running region or a regeneration region based on the electrical angular frequency ωr and the torque command T*.

Specifically, the power running/regeneration determination unit 203 determines that the operation is in the power running region and outputs "1" if the product of the electrical angular frequency ωr and the torque command T* is zero or positive, and determines that the operation is in the regeneration region and outputs "0" if the product is negative.

Based on the output of the power running/regeneration determination unit 203, the switching unit 204 selects the output of either the correction current calculation unit (power running) 201 or the correction current calculation unit (regeneration) 202, and outputs the selected output to the correction gain computing unit 206. Specifically, if the output of the power running/regeneration determination unit 203 is "1", the correction current for power running ΔIcmp_p, which is the output of the correction current calculation unit (power running) 201, is selected and output to the correction gain computing unit 206 as a correction current ΔIcmp. In addition, if the output of the power running/regeneration determination unit 203 is "0", the correction current for regeneration ΔIcmp_g, which is the output of the correction current calculation unit (regeneration) 202, is selected and output to the correction gain computing unit 206 as the correction current ΔIcmp.

The current absolute value computing unit 205 computes the current amplitude |I| to be used for correction current calculation and correction gain computation, that is, an absolute value of the three-phase AC current based on the following Formula (9).

$$|I| = \sqrt{(Id^2 + Iq^2)} \tag{9}$$

The correction gain computing unit 206 computes a correction gain Kcmp to be used to correct the current detection value based on the following Formula (10).

$$Kcmp = (|I| + \Delta Icmp)/|I| \tag{10}$$

The d-axis correction unit 207 multiplies the first d-axis current detection value Id1 by the correction gain Kcmp computed by the correction gain computing unit 206 to obtain the second d-axis current detection value Id2 according to the following Formula (11).

$$Id2 = Kcmp \times Id1 \tag{11}$$

Similarly to the d-axis correction unit 207, the q-axis correction unit 208 multiplies the first q-axis current detection value Iq1 by the correction gain Kcmp computed by the correction gain computing unit 206 to obtain the second q-axis current detection value Iq2 according to the following Formula (12).

$$Iq2 = Kcmp \times Iq1 \tag{12}$$

As described above, the current detection value correction unit 20 corrects each of the first d-axis current detection value Id1 and the first q-axis current detection value Iq1 based on the modulation rate mod, the power supply voltage E, the switching frequency fc, the filter delay time constant τ, and the current amplitude |I|, and computes the second d-axis current detection value Id2 and the second q-axis current detection value Iq2. As a result, it is possible to effectively suppress the deviation that occurs between the current detection value detected by the current detection unit 7 via the filter 72 and the actual current actually flowing between the motor 2 and the inverter 3.

According to the present embodiment, it is possible to reduce the deviation between the current true value and the detection value, which deteriorates due to the modulation rate and the delay time constant of the RC filter without an additional sensor. As a result, the torque command of the motor coincides with a torque command to be actually output, and highly accurate motor torque can be output. In addition, the true value of the three-phase current of the motor can be detected, and thus, can be prevented from exceeding a detection threshold for protecting the inverter and the motor, and the damage to the inverter and the motor can be prevented.

According to the first embodiment of the present invention described above, the following operational effects are achieved.

(1) The current detection unit 7 detects the three-phase AC currents output from the inverter 3 or input to the inverter 3. The inverter control device 1 controls the inverter 3 based on the current detection values based on the detection results of the three-phase AC currents obtained by the current detection unit 7, that is, the first d-axis current detection value Id1 and the first q-axis current detection value Iq1, and the predetermined current command values, that is, the d-axis current command Id* and the q-axis current command Iq*. The inverter control device 1 includes the current detection value correction unit 20 that corrects the first d-axis current detection value Id1 and the first q-axis current detection value Iq1 so as to correct the detection errors of the three-phase AC currents generated due to the delay time τ of the filter 72 which is the filter element provided in the current detection unit 7. With this configuration, it is possible to suppress the deviation between the detection result of the output current of the inverter 3 and the actual current.

(2) The current detection value correction unit 20 corrects the first d-axis current detection value Id1 and the first q-axis current detection value Iq1 based on the modulation rate mod or the voltage utilization rate of the inverter 3. With this configuration, the current detection value can be corrected so as to suppress the deviation between the actual current and the current command value that changes according to the modulation rate mod or the voltage utilization rate.

(3) The current detection value correction unit 20 corrects the first d-axis current detection value Id1 and the first q-axis current detection value Iq1 according to the above-described Formulas (7) to (12) based on the switching frequency fc of the inverter 3, the power supply voltage E which is the DC voltage applied to the inverter 3, the delay time τ of the filter 72, and the amplitude |I| of the AC current. With this configuration, it is possible to correct the current detection value so as to suppress the deviation between the current command value that changes according to each parameter and the actual current.

(4) The current detection value correction unit 20 computes the correction gain Kcmp based on the modulation rate mod or the voltage utilization rate of the inverter 3, the switching frequency fc of the inverter 3, the power supply voltage E which is the DC voltage applied to the inverter 3, the delay time τ of the filter 72, and the amplitude |I| of the AC current using the correction gain computing unit 206. Specifically, the correction current calculation unit (power running) 201 and the correction current calculation unit (regeneration) 202 compute the correction current for power running ΔIcmp_p and the correction current for regeneration ΔIcmp_g by Formulas (7) and (8), respectively. Then, the correction gain computing unit 206 computes the correction gain Kcmp by Formula (10) using these computation results and the current amplitude |I| computed by Formula (9) in the current absolute value computing unit 205. Furthermore, the d-axis correction unit 207 and the q-axis correction unit 208 correct the first d-axis current detection value Id1 and the first q-axis current detection value Iq1 by multiplying the first d-axis current detection value Id1 and the first q-axis current detection value Iq1 by the correction gain Kcmp according to Formulas (11) and (12), respectively. In this manner, it is possible to correct the current detection value capable of reliably suppressing the deviation between the current command value and the actual current.

Second Embodiment

Subsequently, a second embodiment of the present invention will be described. In the present embodiment, an example of correcting a current command value, instead of a current detection value, will be described.

Figure 14:
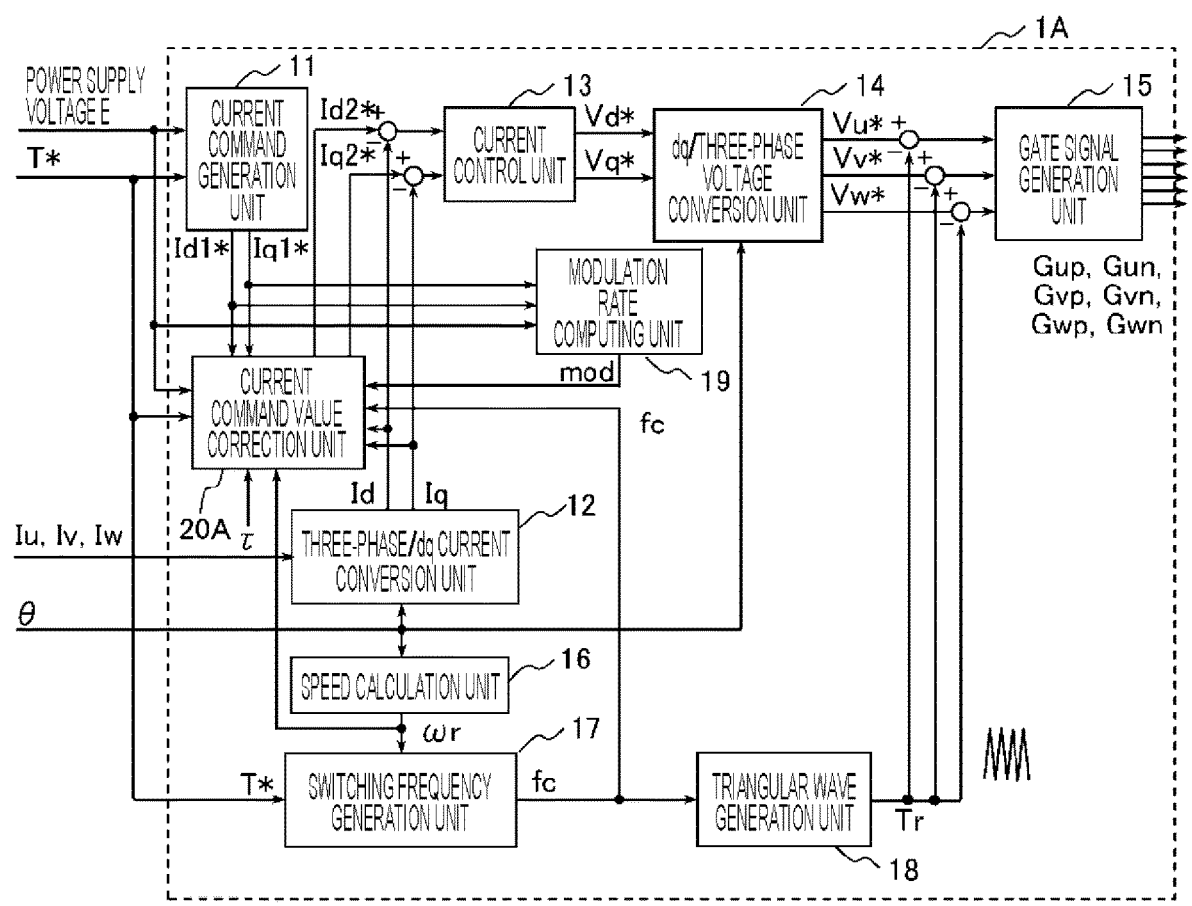
FIG. 14 is a functional block diagram of an inverter control device according to a second embodiment of the present invention.

FIG. 14 is a functional block diagram of an inverter control device 1A according to the second embodiment of the present invention. The inverter control device 1A of the present embodiment is different from the inverter control device 1 of the first embodiment illustrated in FIG. 2 in that a current command value correction unit 20A is provided instead of the current detection value correction unit 20. Note that the inverter control device 1A of the present embodiment is also configured using, for example, a microcomputer, and can implement each functional block by executing a predetermined program in the microcomputer, which is similar to the inverter control device 1. Alternatively, some or all of the functional blocks may be implemented using a hardware circuit such as a logic IC or an FPGA.

The current command value correction unit 20A corrects a d-axis current command Id1* and a q-axis current command Iq1* output from the current command generation unit 11 so as to correct detection errors of the U-phase AC current Iu, the V-phase AC current Iv, and the W-phase AC current Iw generated due to a delay time of the filter 72 provided in the current detection unit 7. Then, a d-axis current command Id2* and a q-axis current command Iq2* according to these correction results are output to the current control unit 13. Hereinafter, the d-axis current command Id1* and the q-axis current command Iq1* before the correction, output from the current command generation unit 11, are referred to as a "first d-axis current command Id1*" and a "first q-axis current command Iq1*", respectively. In addition, the d-axis current command Id2* and the q-axis current command Iq2*, computed by correcting the first d-axis current command Id1* and the first q-axis current command Iq1* using the current command value correction unit 20A, are referred to as a "second d-axis current command Id2*" and a "second q-axis current command Iq2*", respectively.

Figure 15:
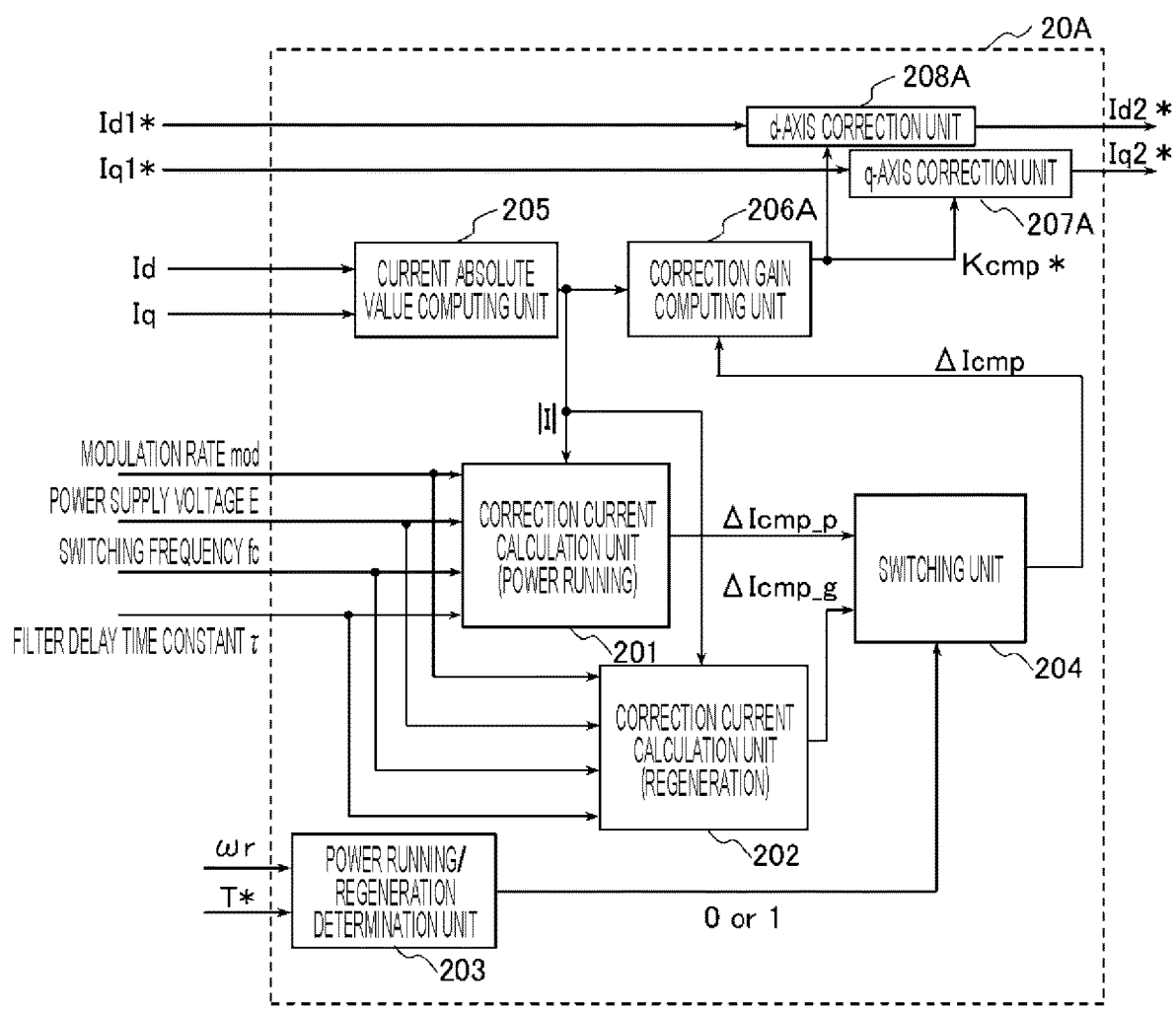
FIG. 15 is a functional block diagram of a current command value correction unit according to the second embodiment of the present invention.

FIG. 15 is a functional block diagram of the current command value correction unit 20A according to the second embodiment of the present invention. The current command value correction unit 20A of the present embodiment is different from the current detection value correction unit 20 of the first embodiment illustrated in FIG. 6 in terms of including a correction gain computing unit 206A, a d-axis correction unit 207A, and a q-axis correction unit 208A instead of the correction gain computing unit 206, the d-axis correction unit 207, and the q-axis correction unit 208, respectively.

The correction gain computing unit 206A computes a correction gain Kcmp* to be used to correct a current command value based on the following Formula (13).

$$Kcmp^* = (|I| - \Delta Icmp)/|I| \tag{13}$$

The d-axis correction unit 207A multiplies the first d-axis current command Id1* by the correction gain Kcmp* computed by the correction gain computing unit 206A to obtain a second d-axis current command Id2* according to the following Formula (14).

$$Id2^* = Kcmp^* \times Id1^* \tag{14}$$

Similarly to the d-axis correction unit 207A, the q-axis correction unit 208A multiplies the first q-axis current command Iq1* by the correction gain Kcmp* computed by the correction gain computing unit 206A to obtain a second q-axis current command Iq2* according to the following Formula (15).

$$Iq2^* = Kcmp^* \times Iq1^* \quad (15)$$

As described above, the current command value correction unit 20A corrects the first d-axis current command Id1* and the first q-axis current command Iq1* based on the modulation rate mod, the power supply voltage E, the switching frequency fc, the filter delay time constant τ, and the current amplitude |I|, and computes the second d-axis current command Id2* and the second q-axis current command Iq2*. As a result, it is possible to effectively suppress a deviation that occurs between a current detection value detected by the current detection unit 7 via the filter 72 and an actual current actually flowing between the motor 2 and the inverter 3, which is similar to the first embodiment.

Third Embodiment

Subsequently, a third embodiment of the present invention will be described. In the present embodiment, a description will be given regarding an example in which the current detection value correction unit 20 of FIG. 2 is achieved by a functional configuration different from that described in the first embodiment.

As described with reference to FIG. 7, a deviation between a current command value and a current detection value that changes according to the modulation rate mod is different in direction between power running and regeneration, and thus, a correction current also needs to be changed between the power running and the regeneration accordingly. However, a difference in the correction current between the power running and the regeneration is only a difference in direction with respect to the current command value, that is, a difference between positive and negative signs. Therefore, the functional configuration of the current detection value correction unit 20 is simplified in consideration of this point in the present embodiment.

Figure 16:
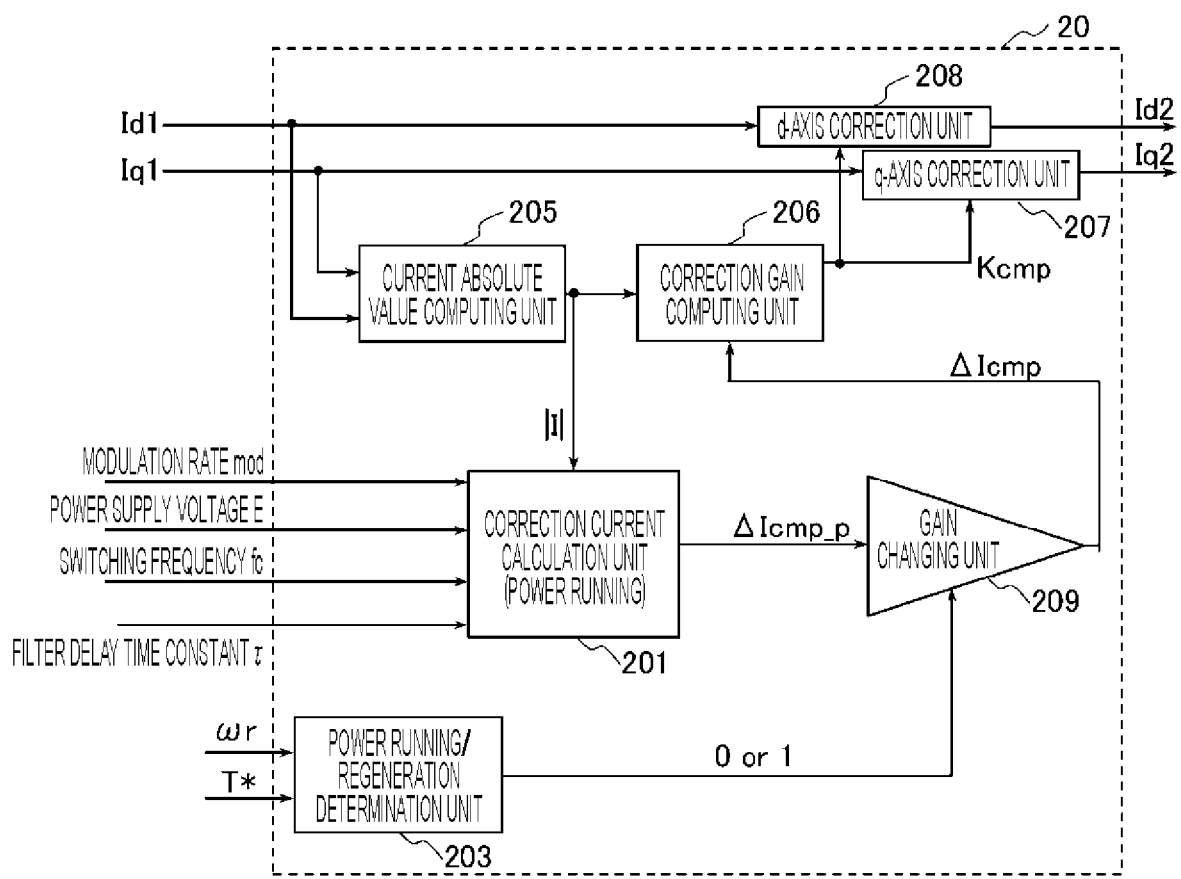
FIG. 16 is a functional block diagram of a current detection value correction unit according to a third embodiment of the present invention.

FIG. 16 is a functional block diagram of the current detection value correction unit 20 according to the third embodiment of the present invention. The current detection value correction unit 20 of the present embodiment is different from that of the first embodiment illustrated in FIG. 6 in that the correction current calculation unit (regeneration) 202 is not provided and a gain changing unit 209 is provided instead of the switching unit 204.

The gain changing unit 209 multiplies the correction current for power running ΔIcmp_p output from the correction current calculation unit (power running) 201 by a gain of 1 or −1 based on an output of the power running/regeneration determination unit 203. Specifically, if the output of the power running/regeneration determination unit 203 is "1", the correction current for power running ΔIcmp_p is multiplied by 1, and is output to the correction gain computing unit 206 as the correction current ΔIcmp. In addition, if the output of the power running/regeneration determination unit 203 is "0", the correction current for power running ΔIcmp_p is multiplied by −1 to invert the sign, and is output to the correction gain computing unit 206 as the correction current ΔIcmp. As a result, the sign of the correction current ΔIcmp is inverted according to whether the operation of the inverter 3 is in a power running region or a regeneration region.

According to the third embodiment of the present invention described above, it is possible to achieve the same operational effects as those described in the first embodiment while simplifying the functional configuration of the current detection value correction unit 20.

Note that the correction current calculation unit (power running) 201 can be omitted instead of the correction current calculation unit (regeneration) 202 in the third embodiment of the present invention described above. In this case, it is sufficient to invert the positive and negative of a gain to be multiplied by the gain changing unit 109. That is, the current detection value correction unit 20 of the present embodiment can be achieved by providing either the correction current calculation unit (power running) 201 or the correction current calculation unit (regeneration) 202.

In addition, the same computing method as that of the third embodiment of the present invention described above may be applied to the current command value correction unit 20A described in the second embodiment. Even in this case, it is possible to achieve the same effects as those described in the second embodiment.

Fourth Embodiment

Subsequently, a fourth embodiment of the present invention will be described. In the present embodiment, a description will be given regarding an example in which the current detection value correction unit 20 of FIG. 2 is achieved by a functional configuration different from those described in the first and third embodiments.

Figure 17:
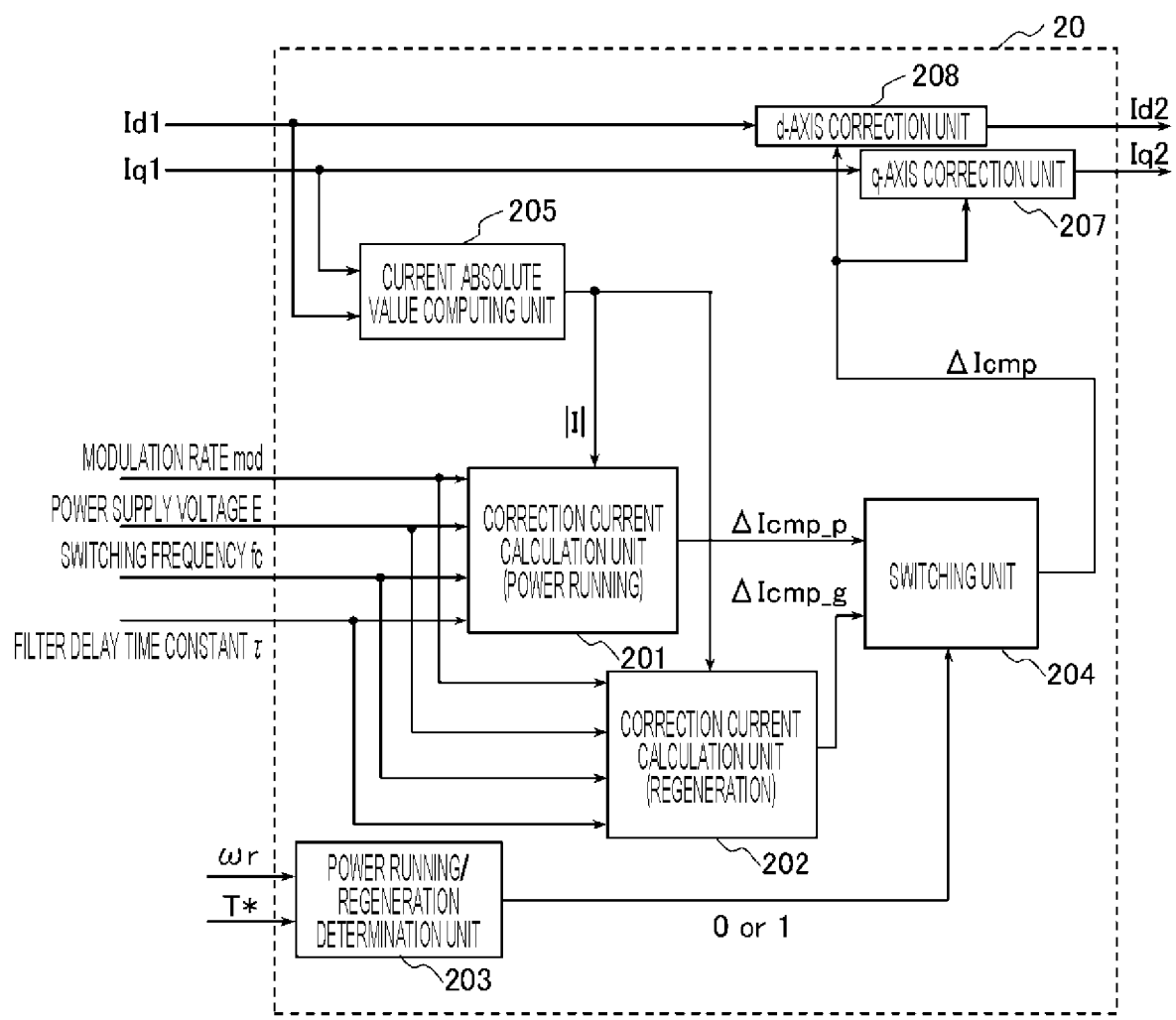
FIG. 17 is a functional block diagram of a current detection value correction unit according to a fourth embodiment of the present invention.

FIG. 17 is a functional block diagram of the current detection value correction unit 20 according to the fourth embodiment of the present invention. The current detection value correction unit 20 of the present embodiment is different from that of the first embodiment illustrated in FIG. 6 in that the correction gain computing unit 206 is not provided, and the correction current ΔIcmp is input to the d-axis correction unit 207 and the q-axis correction unit 208 instead of the correction gain Kcmp.

In the present embodiment, the d-axis correction unit 207 adds the correction current ΔIcmp to the first d-axis current detection value Id1 to obtain the second d-axis current detection value Id2 according to the following Formula (16).

$$Id2 = Id1 + \Delta Icmp \quad (16)$$

Similarly to the d-axis correction unit 207, the q-axis correction unit 208 adds the correction current ΔIcmp to the first q-axis current detection value Iq1 to obtain the second q-axis current detection value Iq2 according to the following Formula (17).

$$Iq2 = Iq1 + \Delta Icmp \quad (17)$$

According to the fourth embodiment of the present invention described above, it is possible to achieve the same operational effects as those described in the first embodiment while simplifying the functional configuration of the current detection value correction unit 20.

Note that the same computing method as that of the fourth embodiment of the present invention described above may be applied to the current command value correction unit 20A described in the second embodiment and the current detection value correction unit 20 described in the third embodiment. Even in this case, it is possible to achieve the same effects as those described in the second and third embodiments.

Fifth Embodiment

Next, an embodiment in which the inverter control device according to the present invention is applied to an electric vehicle system will be described with reference to FIG. 18.

Figure 18:
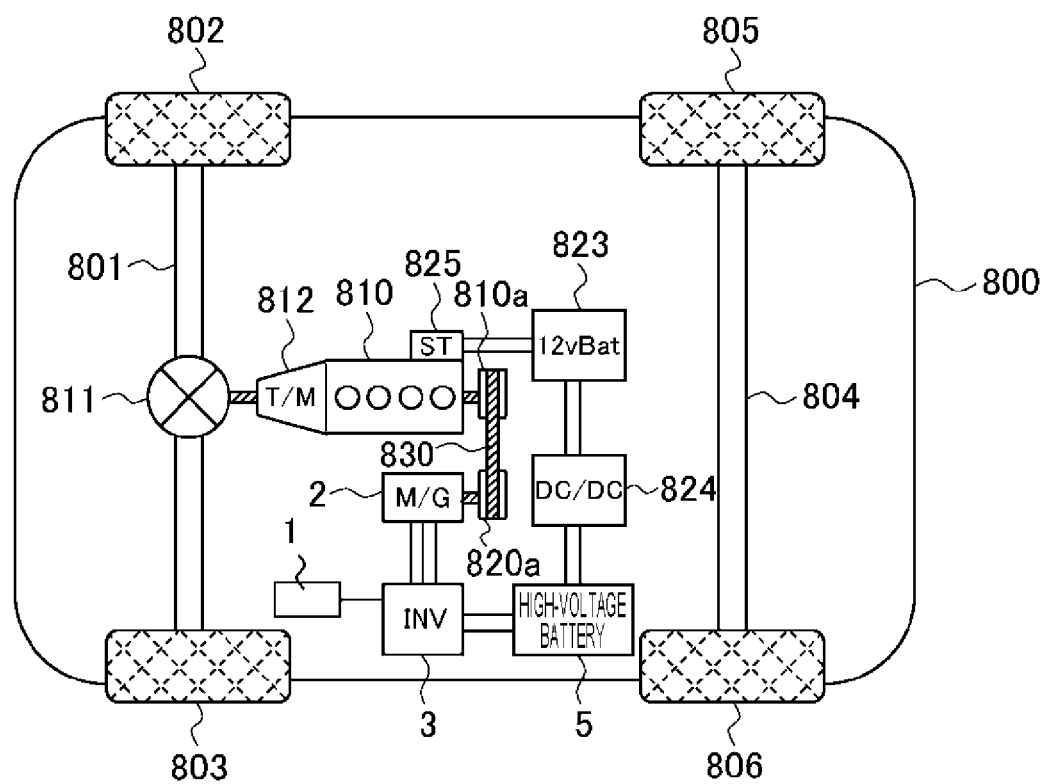
FIG. 18 is a configuration diagram of an electric vehicle system according to a fifth embodiment of the present invention.

FIG. 18 is a configuration diagram of an electric vehicle system according to a fifth embodiment of the present invention. As illustrated in FIG. 18, the electric vehicle system of the present embodiment includes a power train to which the motor 2 is applied as a motor/generator.

In the electric vehicle system of FIG. 18, a front wheel axle 801 is pivotably supported on a front portion of a vehicle body 800, and front wheels 802 and 803 are provided at both ends of the front wheel axle 801. A rear wheel axle 804 is pivotably supported on a rear portion of the vehicle body 800, and rear wheels 805 and 806 are provided at both ends of the rear wheel axle 804.

A differential gear 811 which is a power distribution mechanism is provided at the center of the front wheel axle 801 so as to distribute a rotational driving force, transmitted from an engine 810 via a transmission 812, to right and left portions of the front wheel axle 801. In the engine 810 and the motor 2, a pulley 810a provided on a crankshaft of the engine 810 and a pulley 820a provided on a rotation shaft of the motor 2 are mechanically connected through a belt 830.

As a result, a rotational driving force of the motor 2 can be transmitted to the engine 810, and the rotational driving force of the engine 810 can be transmitted to the motor 2. In the motor 2, three-phase AC power output from the inverter 3 according to the control of the inverter control device 1 is supplied to a stator coil of a stator, so that the rotor rotates to generate the rotational driving force according to the three-phase AC power.

That is, the motor 2 operates as an electric motor by being driven by the inverter 3 based on the control of the inverter control device 1, and operates as a generator that generates the three-phase AC power as the rotor rotates by receiving the rotational driving force of the engine 810 and an electromotive force is induced in the stator coil of the stator.

The inverter 3 is a power conversion device that converts DC power supplied from the high-voltage battery 5, which is a high-voltage (42 V or 300 V) system power supply, into the three-phase AC power, and controls a three-phase AC current flowing through the stator coil of the motor 2, which depends on a magnetic pole position of the rotor, according to the operation command value.

The three-phase AC power generated by the motor 2 is converted into DC power by the inverter 3 to charge the high-voltage battery 5. The high-voltage battery 5 is electrically connected to a low-voltage battery 823 through a DC-DC converter 824. The low-voltage battery 823 forms a low voltage (14 V) system power supply of the electric vehicle system, and is used as the power supply for a starter 825 for initial start (cold start) of the engine 810, a radio, a light, and the like.

The engine 810 is stopped when the vehicle stops such as waits for a traffic light (an idle stop mode), and the motor 2 is driven by the inverter 3 to restart the engine 810 at the time of restart (hot start) of the engine 810 when the vehicle is restarted. In the idle stop mode, the engine 810 is not stopped and continues to be driven in a case where the amount of charge of the high-voltage battery 5 is insufficient, a case where the engine 810 is not sufficiently warmed, or the like. In addition, it is necessary to secure a drive source for auxiliary machines using the engine 810 as the drive source, such as a compressor of an air conditioner, during the idle stop mode. In this case, the motor 2 is driven to drive the auxiliary machines.

Even in an acceleration mode or a high-load operation mode, the motor 2 is driven to assist the driving of the engine 810. On the other hand, in a charging mode in which the high-voltage battery 5 needs to be charged, the engine 810 causes the motor 2 to generate power to charge the high-voltage battery 5. That is, a regeneration mode such as braking or deceleration of the vehicle is performed.

In the electric vehicle system of the present embodiment using the inverter control device 1, a deviation between a current true value and a detection value, which deteriorates due to a modulation rate and a delay time constant of an RC filter, can be reduced without an additional sensor, and thus, a command value coincides with actual torque, and highly accurate motor torque can be output. Thus, torque desired by a driver can be achieved with an inexpensive configuration. Furthermore, a true value of a three-phase current of the motor can be detected, and thus, does not exceed a detection threshold for protecting the inverter and the motor, damage to the inverter and the motor can be prevented, and driving stop of an electrically-driven vehicle can be prevented.

Note that a case where the electric vehicle system of the present embodiment is a hybrid electric vehicle has been described, but similar effects can be obtained even in a plug-in hybrid electric vehicle, an electric vehicle, or the like.

In addition, the inverter control device alone has been described in each of the above embodiments. However, the present invention can also be applied to an inverter device in which an inverter control device and an inverter are integrated or a motor drive system in which an inverter device and a motor are integrated as long as the above-described functions are provided.

Note that the present invention is not limited to the above-described embodiments, and various modifications can be made within a range not departing from a gist of the present invention.

REFERENCE SIGNS LIST 1, 1A inverter control device
2 motor
3 inverter
5 high-voltage battery
6 motor drive device
7 current detection unit
11 current command generation unit
12 three-phase/dq current conversion unit
13 current control unit
14 dq/three-phase voltage conversion unit
15 gate signal generation unit
16 speed calculation unit
17 switching frequency generation unit
18 triangular wave generation unit
19 modulation rate computing unit
20 current detection value correction unit
20A current command value correction unit
21 rotation position sensor
22 rotation position detector
31 inverter circuit
32 pulse width modulation signal output unit
33 smoothing capacitor
71 current detection element
72 filter
73 analog/digital (AD) converter
201 correction current calculation unit (power running)
202 correction current calculation unit (regeneration)
203 power running/regeneration determination unit
204 switching unit
205 current absolute value computing unit
206, 206A correction gain computing unit
207, 207A d-axis correction unit
208, 208A q-axis correction unit
209 gain changing unit

The invention claimed is:

1. An inverter control device that controls an inverter based on a current detection value, obtained based on a detection result of an AC current by a current detection unit that detects the AC current output from the inverter or input to the inverter, and a predetermined current command value, the inverter control device comprising
   a correction unit that corrects either the current detection value or the current command value to correct a detection error of the AC current generated due to a delay time of a filter element provided in the current detection unit,
   wherein the correction unit computes a correction current value based on a modulation rate or a voltage utilization rate of the inverter, a switching frequency of the inverter, a DC voltage applied to the inverter, and the delay time of the filter element,
   wherein the correction unit inverts a sign of the correction current value in accordance with whether operation of the inverter is in a power running region or a regeneration region, and
   wherein the correction unit corrects either the current detection value or the current command value by computing a correction gain based on the correction current value and an amplitude of the AC current, and multiplying the current detection value or the current command value by the correction gain.

2. The inverter control device according to claim 1, wherein
   the correction unit corrects either the current detection value or the current command value based on a modulation rate or a voltage utilization rate of the inverter.

3. The inverter control device according to claim 1, wherein
   the correction unit corrects either the current detection value or the current command value based on a switching frequency of the inverter, a DC voltage applied to the inverter, the delay time of the filter element, and an amplitude of the AC current.

4. The inverter control device according to claim 1, wherein
   the correction unit corrects either the current detection value or the current command value by computing a correction current value based on a modulation rate or a voltage utilization rate of the inverter, a switching frequency of the inverter, a DC voltage applied to the inverter, and the delay time of the filter element, and adding the correction current value to the current detection value or the current command value.

5. An electric vehicle system comprising:
   the inverter control device according to claim 1;
   the inverter controlled by the inverter control device; and
   a three-phase synchronous motor driven by the inverter,
   the electric vehicle system traveling using a rotational driving force of the three-phase synchronous motor.

* * * * *